United States Patent
Panchagnula et al.

(10) Patent No.: US 9,807,391 B2
(45) Date of Patent: Oct. 31, 2017

(54) MULTIPLE STREAM VIDEO COMPRESSION IN MULTIPLE BITRATE VIDEO ENCODING

(71) Applicant: ARRIS Enterprises, Inc., Suwanee, GA (US)

(72) Inventors: Ramesh V. Panchagnula, Norcross, GA (US); Alexander D. Raji, Alpharetta, GA (US)

(73) Assignee: ARRIS Enterprises LLC, Suwanee, GA (US)

( * ) Notice: Subject to any disclaimer, the term of this patent is extended or adjusted under 35 U.S.C. 154(b) by 326 days.

(21) Appl. No.: 14/578,955

(22) Filed: Dec. 22, 2014

(65) Prior Publication Data

US 2016/0182906 A1 Jun. 23, 2016

(51) Int. Cl.
| | |
|---|---|
| *H04N 19/124* | (2014.01) |
| *H04N 19/172* | (2014.01) |
| *H04N 19/176* | (2014.01) |
| *H04N 21/234* | (2011.01) |
| *H04N 21/2343* | (2011.01) |
| *H04N 21/2365* | (2011.01) |
| *H04N 21/845* | (2011.01) |

(52) U.S. Cl.
CPC ......... *H04N 19/124* (2014.11); *H04N 19/172* (2014.11); *H04N 19/176* (2014.11); *H04N 21/2365* (2013.01); *H04N 21/23418* (2013.01); *H04N 21/23439* (2013.01); *H04N 21/234363* (2013.01); *H04N 21/8456* (2013.01)

(58) Field of Classification Search
CPC .. H04N 19/124; H04N 19/172; H04N 19/176; H04N 21/23418; H04N 21/234363; H04N 21/23439; H04N 21/2365; H04N 21/8456
See application file for complete search history.

(56) References Cited

U.S. PATENT DOCUMENTS

| | | | |
|---|---|---|---|
| 2010/0158126 A1* | 6/2010 | Bai | H04N 21/234309 375/240.16 |
| 2011/0150076 A1 | 6/2011 | Wang et al. | |
| 2011/0176562 A1 | 7/2011 | Wang | |
| 2011/0305273 A1* | 12/2011 | He | H04N 19/436 375/240.02 |
| 2013/0179589 A1* | 7/2013 | McCarthy | H04N 21/8456 709/231 |
| 2013/0297743 A1* | 11/2013 | Eschet | H04L 65/60 709/219 |
| 2013/0322516 A1* | 12/2013 | Zhang | H04N 19/30 375/240.02 |

OTHER PUBLICATIONS

PCT Search Report & Written Opinion, Re: Application No. PCT/US2015/066316, dated Apr. 12, 2016.

* cited by examiner

*Primary Examiner* — Md Haque
(74) *Attorney, Agent, or Firm* — Bart A. Perkins (57) ABSTRACT

Methods, systems, and computer readable media can be operable to reduce the number of video streams or increase the quality of delivered video with the same number of video streams in a multiple bitrate video encoding. Multiple video resolutions and/or frame rates can be combined into a single stream. In embodiments, optimal segments from a plurality of input streams can be selected for inclusion in an output stream based upon a range of acceptable quantization parameter values for the output stream and a quality characteristic associated with the optimal input stream.

17 Claims, 6 Drawing Sheets

MULTIPLE STREAM VIDEO COMPRESSION IN MULTIPLE BITRATE VIDEO ENCODING

TECHNICAL FIELD

This disclosure relates to video compression in multiple bitrate video encoding.

BACKGROUND

Generally, the optimal bitrate at which to deliver a video stream to a subscriber will vary according to many different factors (e.g., the type of device requesting the video stream, the amount of bandwidth the subscriber has at a certain time, and others). Multiple bitrate (MBR) encoding is used for delivering video over Internet protocol (IP) networks. Typically, in MBR encoding, a single input stream (e.g., video stream) is ingested by an encoding device, and the ingested video is encoded into multiple output streams, each at different resolutions, bitrates, and/or frame rates.

With the advent of video streaming on the Internet, potential viewers of a program can use their Internet connection to view live or recorded video programs. Due to the variability in the download speed of Internet connections, suppliers of Internet based video programming encode the video content at multiple bitrates to provide uninterrupted viewing for low or fluctuating Internet access speeds.

Video encoding and compression techniques in digital video compression standards (e.g., MPEG-2, H.264, HEVC, etc.) generally involve removing redundant information from a video data stream and making compromises in picture details in order to save bandwidth. The compromises are typically optimized to have minimal perceptual impact. In particular, the Quantization Parameter (QP) regulates how much spatial detail is encoded or abandoned, and consequently the perceptual quality in an encoded picture. The lower the encoding QP value, the higher the level of detail preserved in the encoded picture at the cost of a higher bitrate. As QP parameter is increased, the picture details are aggregated to simplify encoding and decrease the bitrate requirement to compress video.

MBR encoding is generally achieved by encoding the same video program at multiple lower bitrates by lowering the output target CBR bitrate, reducing picture resolution, and possibly reducing video frame rate to achieve the lower bitrate sub-streams. Typically, video is encoded at 4 to 8 different CBR bitrates that have a fixed resolution and frame rate. Encoded video streams are synchronous and are encoded in chunks, or fragments, to provide suitable switch points to another bitrate. The synchronous video fragments in the sub-streams are typically 2 to 10 seconds in duration.

Providing multiple output streams for a single piece of content can consume large amounts of bandwidth and storage and can also negatively affect the quality of the delivered content. Therefore, it is desirable to improve upon the methods and systems for video compression in multiple bitrate video encoding.

BRIEF DESCRIPTION OF THE DRAWINGS

Like reference numbers and designations in the various drawings indicate like elements.

DETAILED DESCRIPTION

Each output stream that is delivered to a subscriber consumes bandwidth and storage. With various subscriber bandwidth and the use of various subscriber devices (e.g., televisions, computers, mobile devices, etc.), video streams are delivered to subscribers at various bitrates in multiple output streams. However, each of the multiple output streams increases the amount of bandwidth and storage that is consumed as a result of providing the individual piece of video content. In embodiments, systems and methods can be operable to combine multiple video streams of different bitrates, resolutions and/or frame rates. Segments or fragments of multiple video streams can be combined in such a way as to utilize an optimal amount of available bandwidth to achieve an optimal level of video quality for an output video stream.

Figure 1:
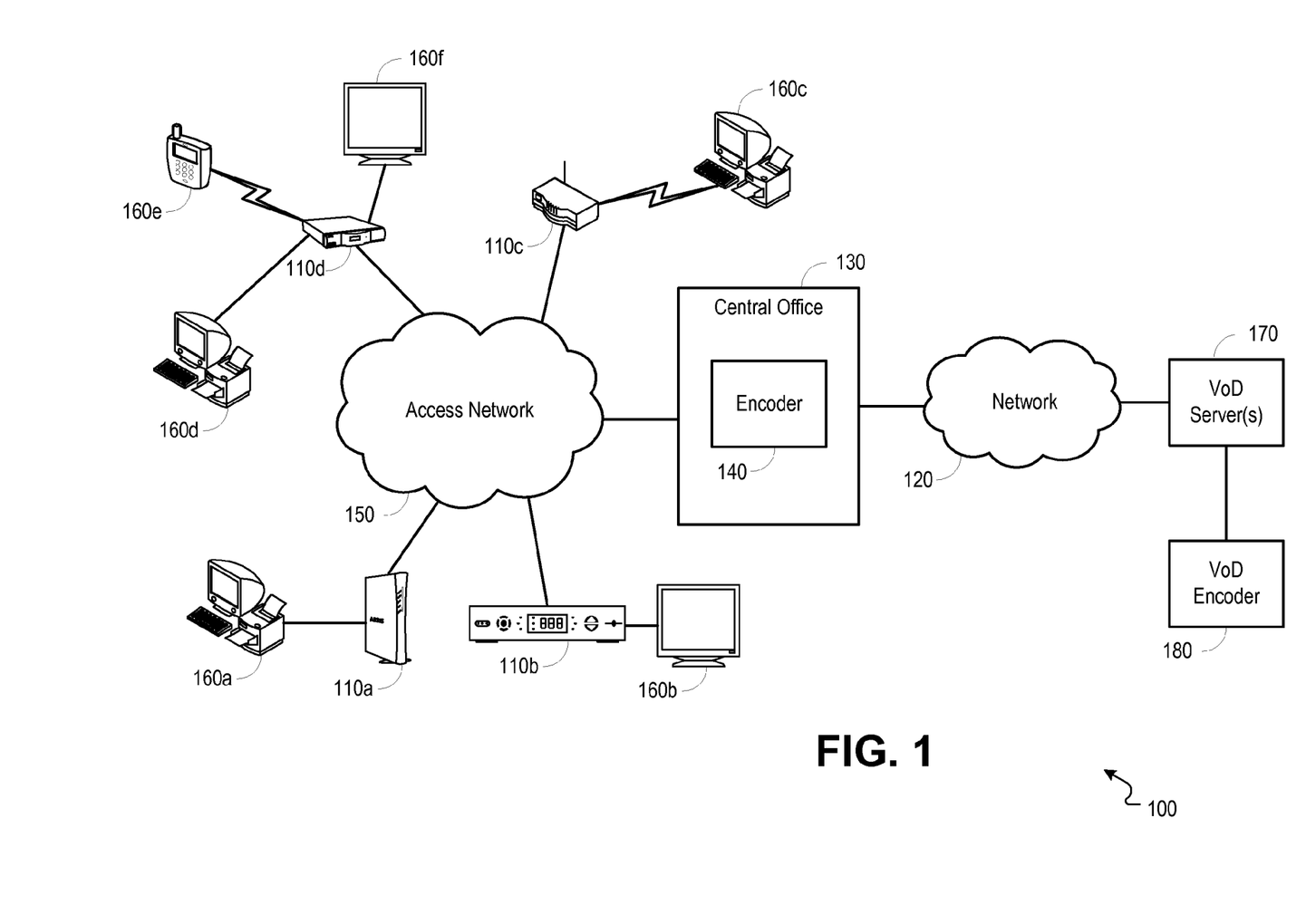
FIG. 1 is a block diagram illustrating an example network environment operable to reduce the number of video streams or increase the quality of delivered video in multiple bitrate video encoding.

FIG. 1 is a block diagram illustrating an example network environment 100 operable to reduce the number of video streams or increase the quality of delivered video in multiple bitrate video encoding. In embodiments, video content can be delivered to customer premise equipment (CPE) devices 110*a*-*d* from a network(s) 120 via a central office 130. In embodiments, video content can be transcoded, or encoded, at a central office 130. For example, an encoder 140 can receive multiple sub-streams associated with an input video stream, and the encoder 140 can combine fragments of the multiple sub-streams into a single output stream. In embodiments, the central office 130 can be a cable headend (e.g., cable modem termination system (CMTS)), digital subscriber line access multiplexer (DSLAM), mobile cellular base station, wireless access point or optical line terminal (OLT).

In embodiments, a central office 130 can deliver video content to CPE devices 110*a*-*d* through an access network 150. In embodiments, the access network 150 can be a DOCSIS based Hybrid-Fiber Coax (HFC) network, digital subscriber loop (DSL), mobile cellular network (e.g., 3G, 4G, LTE, etc.), wireless network (e.g., 802.11, 802.16, etc.), fiber to the curb (FTTC), fiber to the premise (FTTP) network, or other broadband access network. In embodiments, CPE device(s) 110*a*-*d* can be, for example, a cable modem or embedded media terminal adapter (eMTA) 110*a*, a set-top box 110*b*, a wireless router including an embedded cable modem 110*c*, or a gateway 110*d*. It should be understood that CPE devices 110*a*-*d* can also include a digital subscriber line (DSL) modem, a voice over internet protocol (VOIP) terminal adapter, a video game console, a digital versatile disc (DVD) player, a communications device, an optical network unit (ONS), or the like. CPE device(s) 110a-d can also include a local interface that can forward IP video streams to one or more external devices. For example, the local interface can be based on the Multimedia over Coax Alliance (MoCA), 802.11, Ethernet, universal serial bus (USB), G.hn specifications, or other home networking specifications.

By way of example, FIG. 1 depicts a cable modem or eMTA 110a, a set top box 110b, a wireless router (including an embedded cable modem) 110c, and a gateway 110d. The cable modem or eMTA 110a is shown facilitating communications from the access network 150 to a computer 160a. The set-top box 110b is shown facilitating communications from the access network 150 to a television 160b or a digital video recorder (DVR). A wireless router 110c is shown facilitating wireless communications between a computer 160c and the access network 150. A gateway 110d is shown facilitating communications between the access network 150 and a computer 160d, a mobile device 160e, and a television 160f. In embodiments, a gateway 110d may include an encoder which can be operable to ingest an input video stream and output the input video stream as one or more output video streams at various bitrates, resolutions and/or frame rates.

In embodiments, one or more video on demand (VoD) server(s) 170 can provide video content to one or more central office(s) 130 through a network 120. In embodiments, VoD server(s) 170 can be coupled with a VoD encoder 180. The VoD encoder 180 can be operable to ingest an input video stream from the VoD server(s) 170 and output the input video stream as one or more output video streams at various bitrates, resolutions and/or frame rates It should be understood that while the VoD encoder 180 is shown separated from the VoD server 170, a VoD encoder 180 can be embedded in a VoD server 170.

Figure 2:
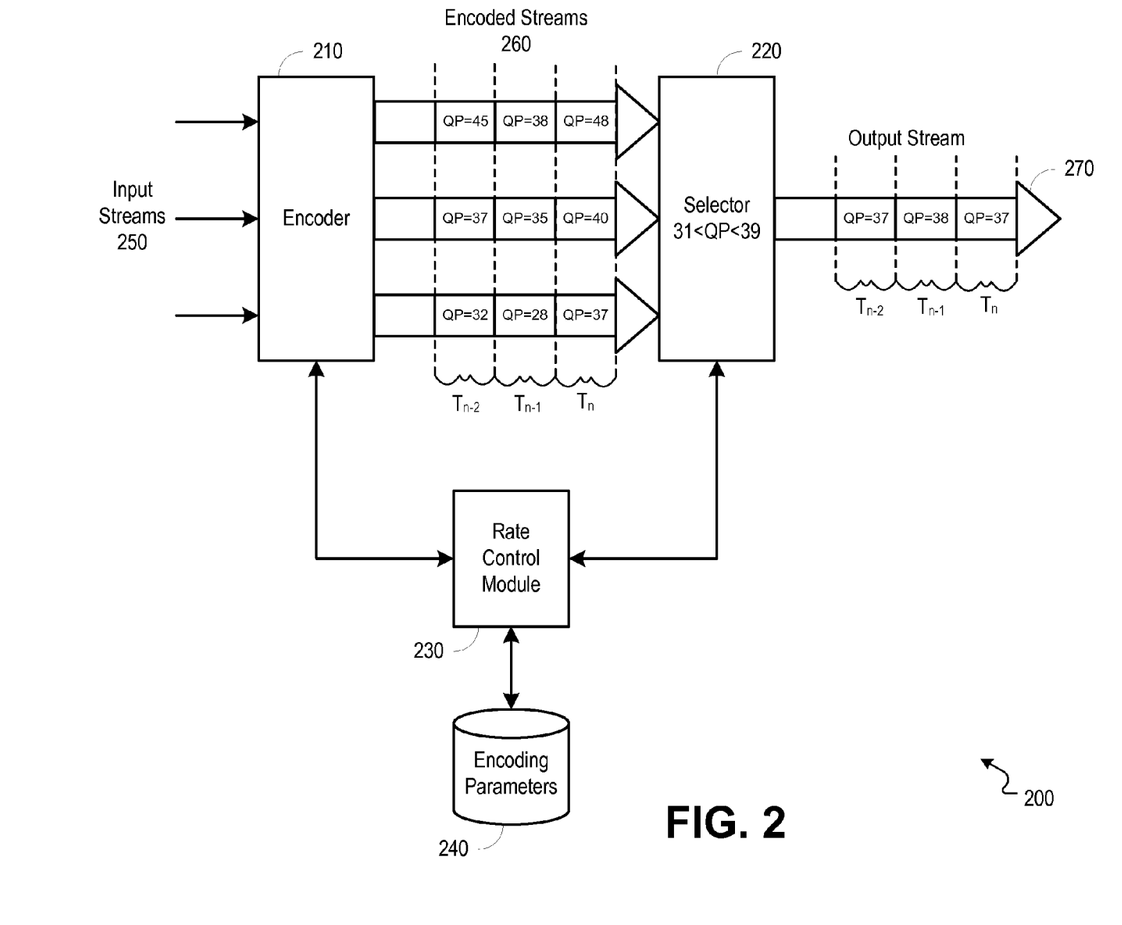
FIG. 2 is a block diagram illustrating an example system operable to reduce the number of video streams or increase the quality of delivered video in multiple bitrate video encoding by combining fragments of multiple encoded input streams.

FIG. 2 is a block diagram illustrating an example system 200 operable to reduce the number of video streams or increase the quality of delivered video in multiple bitrate video encoding by combining fragments of multiple encoded sub-streams. It should be understood that the system 200 can be implemented in various systems and/or devices in which a video stream is ingested and output at various bitrates, resolutions and/or frame rates. For example, the system 200 can be implemented in a central office 130 of FIG. 1, a gateway 110d of FIG. 1, or in combination with a VoD server, as well as other systems and devices. In embodiments, the system 200 may include an encoder 210, a selector 220, a rate control module 230, and an encoding parameters data store 240. In embodiments, the encoder 210 may include one or more inputs for receiving video input streams 250.

In embodiments, the encoder 210 can encode multiple input video streams (e.g., input streams 250) to various resolutions and/or bitrates using various encoding formats (e.g., MPEG-2, H.264, AVS, MVC, HEVC, etc.) and can output the encoded streams (e.g., encoded streams 260). For example, the encoder 210 can receive the same piece of video content as multiple input streams 250, the multiple input streams 250 being associated with various resolutions, and the encoder 210 can encode each of the input streams 250 as an encoded stream 260. In embodiments, each encoded stream 260 associated with the same piece of video content can be encoded at the same bitrate (e.g., a constant bitrate).

In embodiments, each encoded stream 260 can comprise multiple fragments (e.g., multiple segments of the associated piece of video content), and each fragment can be associated with a specific fragment of each of the other encoded streams 260. For example, associated fragments across the encoded streams 260 associated with the same piece of video content can each comprise packets associated with the same segment of the piece of video content. In embodiments, the fragments can be synchronized across the encoded streams 260 in such a way that the start and end of each fragment correspond to the same video content.

In embodiments, a rate control module 230 can assign a QP value to each individual picture or sub-picture of a fragment within the multiple encoded streams 260. For example, a rate control module 230 can assign a QP value to an individual picture, or a macroblock(s) within a picture, based upon the fragment's complexity (e.g., resolution, frame rate, motion, texture information, etc.) and a target bitrate (e.g., the bitrate to which the encoded streams 260 are encoded). A fragment's QP value is based on the complexity of the fragment and the bitrate to which an associated video stream is encoded. A fragment with a lower QP value is encoded to a higher bitrate, while a fragment with a higher QP value can be encoded at a lower bitrate.

In embodiments, a rate control module 230 can decide on the QP value based on the bitrate target for a video stream (e.g., output stream 270). The rate control module 230 can operate on a group of pictures (GOP) at a time. In embodiments, the inputs to the rate control module 230 for each GOP can be a bit rate target and an estimated residual complexity of consecutive picture elements. The rate control module 230 can use the residual complexity and available bitrate to assign a QP value for each picture element.

In embodiments, a rate control module 230 can establish a QP range for an output stream 270. For example, the rate control module 230 can establish a range of acceptable QP values (e.g., a maximum and a minimum QP value for a specific output stream or end user) for an output stream 270 based upon a required level of perceptual quality (e.g., resolution, frame rate, motion, texture information, etc.) and a maximum bitrate associated with the output stream's destination. By varying the QP range, the rate control module 230 can utilize a majority of available bandwidth to achieve an optimal video quality (e.g., a lowest overall QP value) possible for each GOP, and thereby producing a CBR video output. In embodiments, the rate control module 230 can establish a range of acceptable QP values for an output stream 270 based upon a variety of parameters stored at the encoding parameters data store 240. For example, parameters stored at the encoding parameters data store 240 can include height, width, bitrate and other encoding settings associated with the encoder 210 and/or input streams 250.

In embodiments, a selector 220 can be operable to ingest multiple encoded streams 260 and compare associated fragments from each of the encoded streams 260. As an example, each of the associated fragments can be the same portion of a piece of video content (e.g., the same period of time having the same start time and the same end time with reference to the relevant piece of video content). In embodiments, the selector 220 can compare each of the fragments associated with a segment (e.g., segments $T_n$, $T_{n-1}$, $T_{n-2}$, etc.), and can identify the fragment having the highest QP value that is within the QP range that is established for the output stream 270 (e.g., an optimal input stream segment). As an example, with a QP range between 31 and 39, the selector 220 can identify the fragment from segment $T_n$ having a QP value of 37 as the fragment from segment $T_n$ having the highest QP value that is between the QP range of 31 to 39.

In embodiments, the selector 220 can be operable to output an identified fragment (e.g., an optimal input stream segment) from an encoded stream 260 as a fragment in an output stream 270. The selector 220 can identify a fragment from an encoded stream 260 at a specific segment (e.g., $T_n$), and can output the identified fragment at the same segment (e.g., $T_n$) within the output stream 270. For example, the fragment having a QP value of 37 from segment $T_n$ of the encoded stream can be output as segment $T_n$ of the output stream 270.

Figure 3:
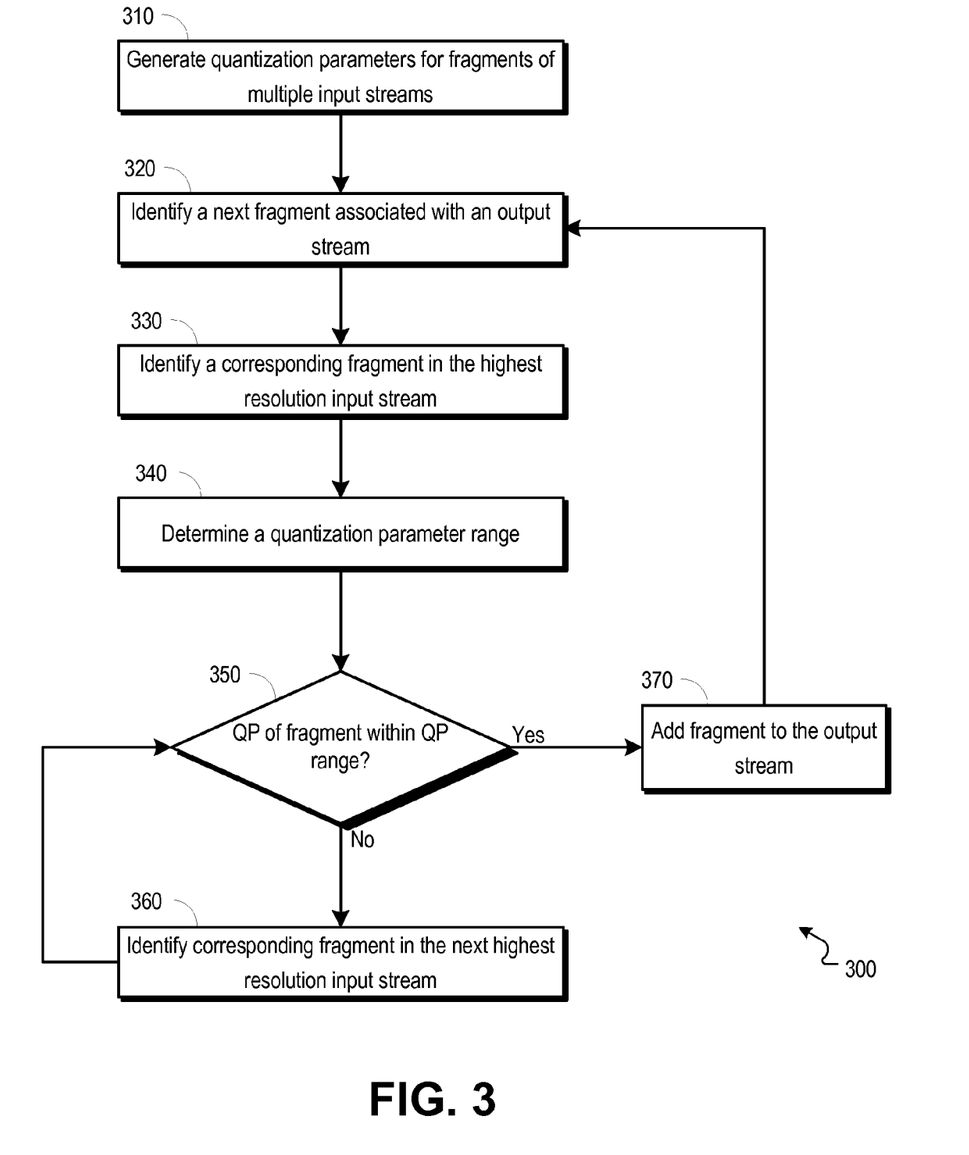
FIG. 3 is a flowchart illustrating an example process for combining fragments from multiple encoded input streams into a single output stream.

FIG. 3 is a flowchart illustrating an example process 300 for combining fragments from multiple encoded sub-streams into a single output stream. The process 300 can begin at 310 where QP values are generated for fragments from a plurality of input streams. QP values can be generated, for example, by a rate control module (e.g., rate control module 230 of FIG. 2). In embodiments, a QP value can be assigned to an individual fragment based upon the fragment's complexity (e.g., resolution, frame rate, motion, texture information, etc.) and a target bitrate (e.g., the bitrate to which the encoded streams are encoded). For example, a rate control module 230 can assign a QP value to a fragment based upon the complexity of the fragment and the bitrate to which the associated input stream (e.g., input streams of FIG. 2) is encoded.

In embodiments, the plurality of input streams can comprise data packets associated with a single piece of video content. For example, the plurality of input streams can comprise the same video content and each of the input streams can be encoded to different resolutions and/or frame rates. In embodiments, each of the plurality of input streams can comprise multiple fragments, and the fragments associated with each of the plurality of input streams can be segmented such that each fragment has a corresponding fragment in each of the other input streams (e.g., each fragment within each of the input streams has the same start time and the same end time within an associated piece of video content as a fragment in the other input streams). A fragment can be a piece of video content that is synchronized across a plurality of sub-streams (e.g., encoded streams 260 of FIG. 2) in such a way that the piece of video content has the same start and end times across the plurality of sub-streams.

At 320, a next fragment (e.g., the fragment that is to be next output) associated with an output stream can be identified. The next fragment can be identified, for example, by a selector 220 of FIG. 2.

At 330, a corresponding fragment in the input stream that is encoded at the highest resolution of the multiple input streams can be identified. The corresponding fragment can be identified, for example, by a selector 220 of FIG. 2. In embodiments, the corresponding fragment can be the input stream fragment that has the same start time and end time within the associated video content as the identified next fragment.

At 340, a QP value range associated with the output stream can be determined. The QP value range can be determined, for example, by a rate control module 230 of FIG. 2. In embodiments, the rate control module 230 can establish a range of acceptable QP values (e.g., a maximum and a minimum QP value for a specific output stream or end user) for an output stream 250 of FIG. 2 based upon a required level of perceptual quality (e.g., resolution, bitrate, motion, texture information, etc.) and a maximum bitrate associated with the output stream's destination.

At 350, a determination can be made whether the QP value associated with the identified fragment is within the determined QP value range. The determination whether the QP value associated with the identified fragment is within the determined QP value range can be made, for example, by a selector 220 of FIG. 2. Where the QP value associated with the identified fragment is not within the determined QP value range, the process 300 can proceed to 360.

At 360, a corresponding fragment (e.g., an input stream fragment that has the same start time and end time within the associated video content as the identified next fragment) in the input stream that is encoded at the next highest resolution (e.g., the next highest resolution among the other input streams after the currently identified input stream) of the multiple input streams can be identified. The corresponding fragment can be identified, for example, by a selector 220 of FIG. 2.

Returning to 350, where the determination is made that the QP value associated with the identified fragment is within the determined QP value range, the process 300 can proceed to 370. At 370, the identified fragment can be considered an optimal input stream segment candidate for inclusion in the output stream, wherein the segment meets a QP range/video quality requirement. The identified fragment can be added to the output stream, for example, by a selector 220 of FIG. 2.

Figure 4:
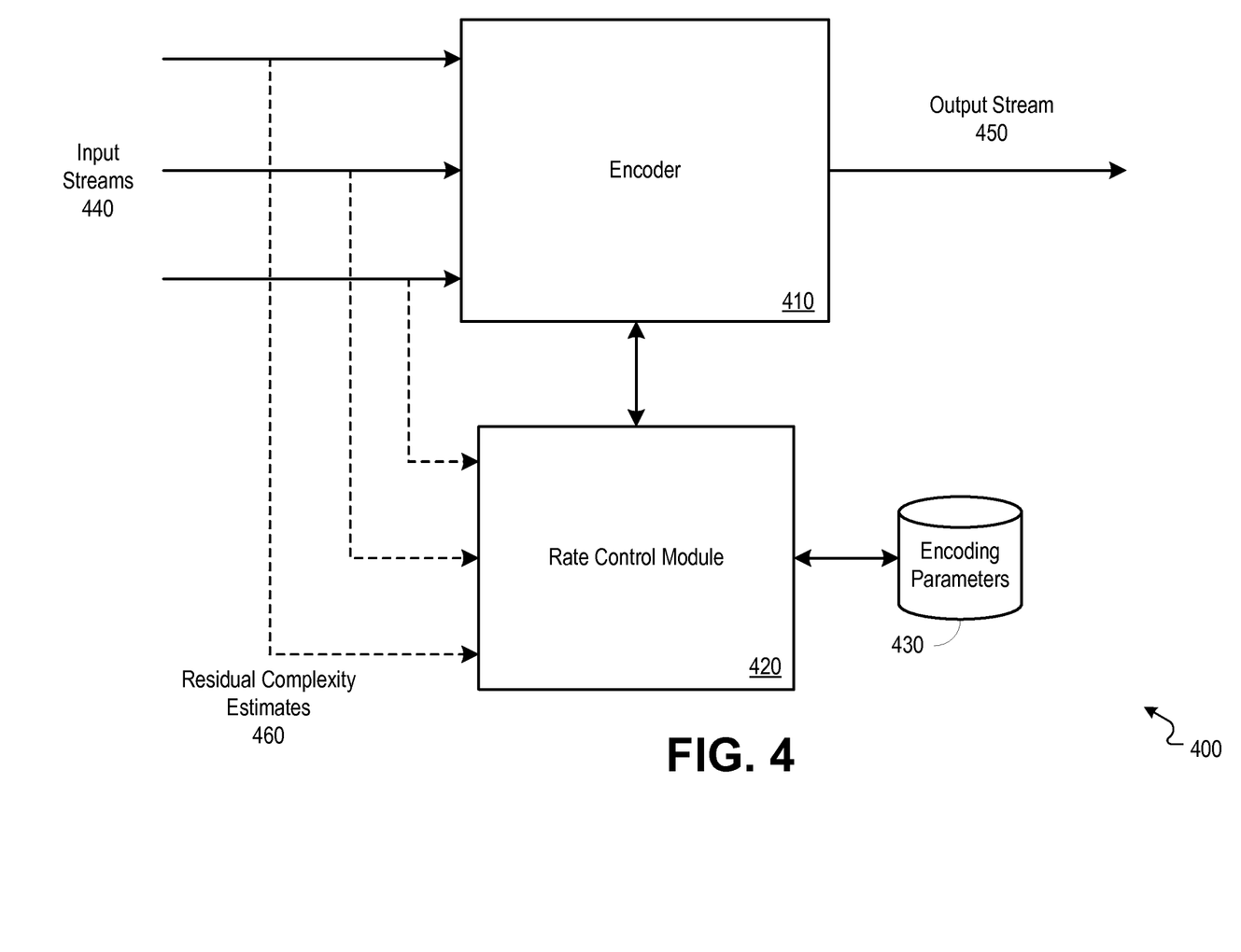
FIG. 4 is a block diagram illustrating an example system operable to reduce the number of video streams or increase the quality of delivered video in multiple bitrate video encoding by encoding and combining various fragments from multiple input streams into a single output stream.

FIG. 4 is a block diagram illustrating an example system 400 operable to reduce the number of video streams or increase the quality of delivered video in multiple bitrate video encoding by encoding and combining various fragments from multiple sub-streams into a single output stream. It should be understood that the system 400 can be implemented in various systems and/or devices in which a video stream is ingested and output at various bitrates, resolutions and/or frame rates. For example, the system 400 can be implemented in a central office 130 of FIG. 1, a gateway 110*d* of FIG. 1, or in combination with a VoD server, as well as other systems and devices. In embodiments, the system 400 may include an encoder 410, a rate control module 420, and an encoding parameters data store 430. In embodiments, the encoder 410 may include one or more inputs for receiving video input streams (e.g., input streams 440). In embodiments, the input streams 440 comprise data corresponding with the same piece of video content.

In embodiments, the encoder 410 can encode multiple input video streams to various resolutions and/or bitrates using various encoding formats (e.g., MPEG-2, H.264, AVS, MVC, HEVC, etc.) and can output the encoded streams. For example, the encoder 410 can receive the same piece of video content as multiple input streams (e.g., input streams 440), the input streams being received at various resolutions, and the encoder 410 can encode different fragments from a plurality of the multiple input streams and the encoder 410 can output the encoded fragments as a single video stream (e.g., output stream 450). In embodiments, each of the multiple input streams 440 can be encoded at the same bitrate such that the output stream 450 has a constant bitrate.

In embodiments, each of the input streams 440 can comprise multiple fragments (e.g., multiple segments or portions of the associated piece of video content), and each fragment can be associated with a specific segment of each of the other input streams. For example, associated fragments across the input streams associated with the same piece of video content can each comprise packets associated with the same segment of the piece of video content.

In embodiments, a rate control module 420 can assign a QP value to each of the plurality of input streams 440. In embodiments, a rate control module 420 can assign a QP value to each input stream based upon a residual complexity estimate 460 associated with the input stream. For example, a residual complexity estimate 460 can be based upon the input stream's amount of motion and texture detail and the ability of the encoder to track motion. In embodiments, the QP value for an input stream at a given time can be based upon the average QP value of the input stream over a period of time.

In embodiments, a rate control module 420 can determine an acceptable range of QP values (e.g., a maximum and a minimum QP value for a specific output stream or end user) for input streams to encode and output as part of an output stream 450. For example, the rate control module 420 can identify the bitrate to which the plurality of input streams are encoded (e.g., from encoder 410), and the rate control module 420 can determine a maximum and a minimum QP value for an output stream 450 based upon a required level of perceptual quality. In embodiments, perceptual quality can be measured by the amount of error introduced to the video signal during the encoding process. In embodiments, final perceptual quality of a stream can be affected by a variety of factors, including resolution, bitrate, motion, and texture information. In embodiments, the QP value range can be determined based on parameters stored in a data store (e.g., encoding parameters data store 430). It should be understood that the QP value range can change with time. For example, the maximum bitrate at which the output stream 450 can be delivered or a required level of perception quality associated with the output stream 450 might change with time.

In embodiments, a rate control module 420 can identify an input stream from one of the plurality of input streams 440 for encoding and inclusion in the output stream 450. As an example, the rate control module 420 can compare the resolutions and QP values associated with each of the input streams 440. The rate control module 420 can identify the input stream 440 that has the highest resolution and has a QP value within the QP range that is established for the output stream.

In embodiments, a rate control module 420 can instruct an encoder 410 to encode and output the identified input stream (e.g., the highest resolution input stream having a QP value within the established QP range). The encoder 410 can encode the identified input stream and output the encoded stream as an output stream 450.

In embodiments, the rate control module 420 can identify an optimal input stream (e.g., the highest resolution input stream having a QP value within the established QP value range) from the input streams 440 at a variety of intervals (e.g., time intervals, frame intervals, etc.) or reference points associated with the input streams (e.g., points where there is a change in the complexity or type of data within the input streams 440). The rate control module 420 can instruct the encoder 410 to encode the one or more identified intervals (e.g., the one or more optimal input stream segments) of the identified optimal input stream. In embodiments, the encoder 410 can output the one or more optimal input stream segments as part of the output stream 450.

Figure 5:
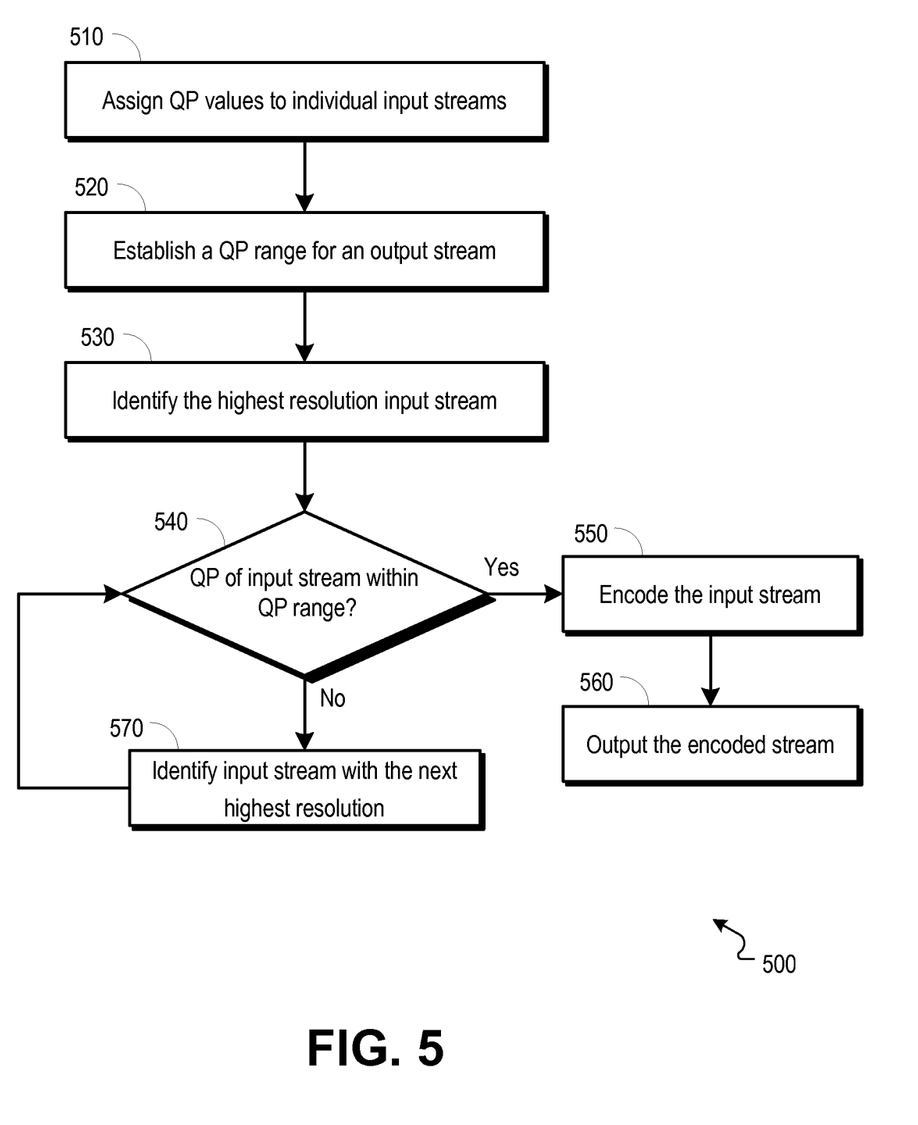
FIG. 5 is a flowchart illustrating an example process for encoding and combining various fragments from multiple input streams into a single output stream.

FIG. 5 is a flowchart illustrating an example process 500 for encoding and combining various fragments from multiple input streams into a single output stream. The process 500 can begin at 510 where QP values are assigned to individual input streams (e.g., input streams 440 of FIG. 4). QP values can be assigned to individual input streams, for example, by a rate control module (e.g., rate control module 420 of FIG. 4). In embodiments, a rate control module can assign a QP value to each input stream based upon the complexity of the input stream (e.g., based upon a residual complexity estimate 460 of FIG. 4 associated with the input stream). For example, a residual complexity estimate 460 can be based upon the input stream's resolution. For example, a residual complexity estimate 460 can be based upon the input stream's amount of motion and texture detail and the ability of the encoder to track motion. In embodiments, the QP value for an input stream at a given time can be based upon the average QP value of the input stream over a period of time.

In embodiments, the input streams can comprise data packets associated with a single piece of video content. For example, the input streams can comprise the same video content and each of the input streams can be associated with different resolutions or frame rates. In embodiments, each of the input streams can comprise multiple fragments, and the fragments associated with each of the input streams can be segmented such that each fragment has a corresponding fragment in each of the other input streams (e.g., each fragment within each of the input streams has the same start time and the same end time within an associated piece of video content as fragments in the other input streams). For example, associated fragments across the input streams (e.g., encoded streams 260 of FIG. 2) associated with the same piece of video content can each comprise packets associated with the same segment of the piece of video content. In embodiments, the fragments can be synchronized across the encoded streams 260 in such a way that the start and end of each fragment correspond to the same video content At 520, a QP range can be established for an output stream (e.g., output stream 450 of FIG. 4). A QP range can be established, for example, by a rate control module 420 of FIG. 4. In embodiments, a rate control module 420 can determine an acceptable range of QP values (e.g., a maximum and a minimum QP value for a specific output stream or end user) for input streams to encode and output as part of an output stream 450. For example, the rate control module 420 can identify the bitrate to which the input streams are encoded (e.g., from encoder 410 of FIG. 4), and the rate control module 420 can determine a maximum and a minimum QP value for an output stream 450 based upon a required level of perceptual quality (e.g., resolution, bitrate, motion, texture information, etc.) and a maximum bitrate associated with the output stream's destination. In embodiments, the QP value range can be determined based on parameters stored in a data store (e.g., encoding parameters data store 430). It should be understood that the QP value range can change with time. For example, the maximum bitrate at which the output stream 450 can be delivered or a required level of perception quality associated with the output stream 450 might change with time.

At 530, the highest resolution input stream of a group of input streams (e.g., a plurality of input streams associated with the same piece of video content) can be identified. The highest resolution input stream can be identified, for example, by a rate control module 420 of FIG. 4.

At 540, a determination can be made whether the QP value associated with the identified input stream is within the established QP range. The determination whether the QP value associated with the identified input stream is within the established QP range can be made, for example, by a rate control module 420 of FIG. 4. Where the QP value associated with the identified input stream is within the established QP range, the process 500 can proceed to 550.

At 550, the identified input stream can be encoded. The identified input stream can be encoded, for example, by an encoder (e.g., encoder 410 of FIG. 4). In embodiments, the encoder 410 can be operable to ingest a plurality of input streams and a rate control module 420 of FIG. 4 can instruct the encoder 410 to encode the highest resolution input stream that has a QP value within the established QP range. In embodiments, the identified input stream can be encoded at one or more intervals (e.g., time intervals, frame intervals, etc.) or reference points associated with the input stream (e.g., points where there is a change in the complexity or type of data within the input stream).

At 560, the encoded stream can be output. The encoded stream can be output, for example, by an encoder (e.g., encoder 410 of FIG. 4). In embodiments, the encoded stream can be output as part of an output stream 450 of FIG. 4, and the output stream 450 can comprise a plurality of fragments (e.g., encoded optimal input stream fragments) having different resolutions.

Returning to 540, where the determination is made that the QP value associated with the identified input stream is not within the established QP range, the process 500 can proceed to 570. At 570, the input stream having the next highest resolution can be identified. The input stream having the next highest resolution can be identified, for example, by a rate control module 420 of FIG. 4. After the input stream having the next highest resolution is identified, the process 500 can proceed to 540.

Figure 6:
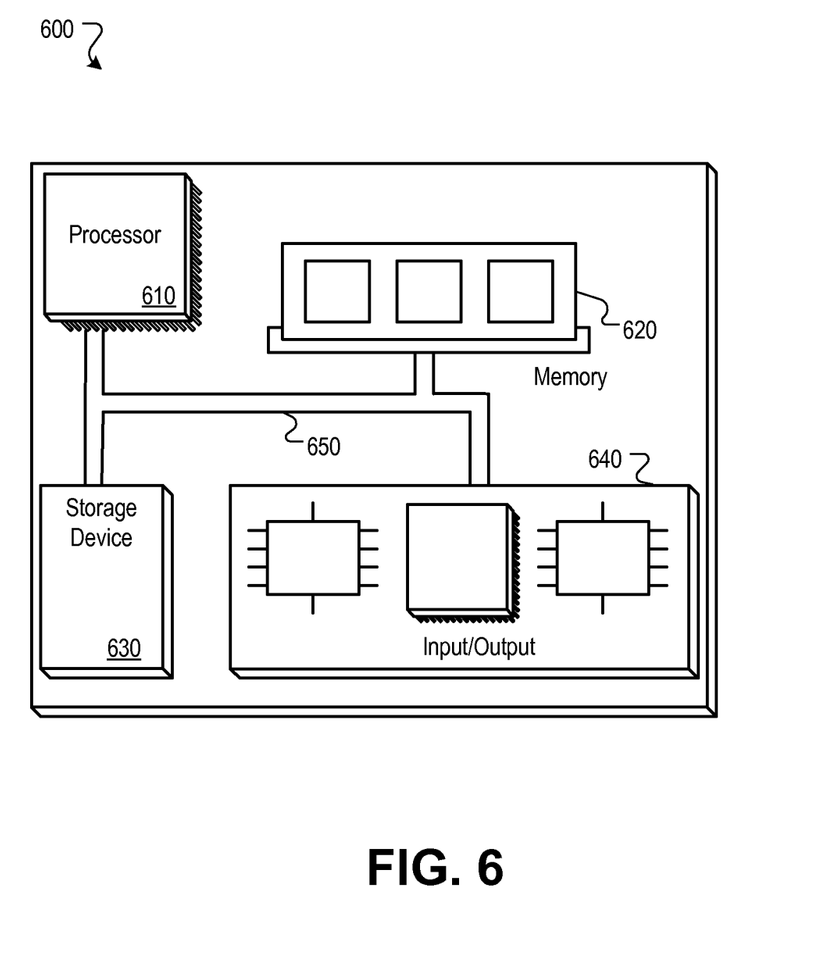
FIG. 6 is a block diagram of a hardware configuration operable to reduce the number of video streams or increase the quality of delivered video in multiple bitrate video encoding.

FIG. 6 is a block diagram of a hardware configuration 600 operable to reduce the number of video streams or increase the quality of delivered video in multiple bitrate video encoding. It should be understood that a system operable to combine fragments from multiple input streams can be embedded into or coupled with any device that is used to transcode and/or encode one or more input streams. The hardware configuration 600 can include a processor 610, a memory 620, a storage device 630, and an input/output device 640. Each of the components 610, 620, 630, and 640 can, for example, be interconnected using a system bus 650. The processor 610 can be capable of processing instructions for execution within the hardware configuration 600. In one implementation, the processor 610 can be a single-threaded processor. In another implementation, the processor 610 can be a multi-threaded processor. The processor 610 can be capable of processing instructions stored in the memory 620 or on the storage device 630.

The memory 620 can store information within the hardware configuration 600. In one implementation, the memory 620 can be a computer-readable medium. In one implementation, the memory 620 can be a volatile memory unit. In another implementation, the memory 620 can be a non-volatile memory unit.

In embodiments, the storage device 630 can be capable of providing mass storage for the hardware configuration 600. In one implementation, the storage device 630 can be a computer-readable medium. In various different implementations, the storage device 630 can, for example, include a hard disk device, an optical disk device, flash memory or some other large capacity storage device. In other implementations, the storage device 630 can be a device external to the hardware configuration 600.

The input/output device 640 provides input/output operations for the hardware configuration 600. In one implementation, the input/output device 640 can include one or more of a network interface device (e.g., an Ethernet card), a serial communication device (e.g., an RS-232 port), one or more universal serial bus (USB) interfaces (e.g., a USB 2.0 port) and/or a wireless interface device (e.g., an 802.11 card). In another implementation, the input/output device can include driver devices configured to receive input data and send output data to other input/output devices, such as one or more display devices (e.g., television, computer, mobile device, etc.), as well as sending communications and video streams to, and receiving communications and video streams from one or more networks (e.g., access network 150 of FIG. 1, network(s) 120 of FIG. 1, etc.).

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer readable medium. The computer readable medium can be a machine readable storage device, a machine readable storage substrate, a memory device, or a combination of one or more of them.

The term "system processor" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer.

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that in embodiments the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In embodiments, multitasking and parallel processing may be advantageous.

We claim:

1. A computer-implemented method comprising:
   receiving a plurality of input streams;
   determining a quantization parameter value for a portion of each of the plurality of input streams;
   determining a range of acceptable quantization parameter values for an output stream, wherein the range of acceptable quantization parameter values comprises a plurality of quantization parameter values bound by a minimum quantization parameter value and a maximum quantization parameter value, wherein the minimum and maximum quantization parameter values are determined based upon a certain level of perceptual quality and a maximum bitrate available for delivery of the output stream to a destination;
   selecting an optimal input stream from the plurality of input streams based upon the range of acceptable quantization parameter values for the output stream and a quality characteristic associated with the optimal input stream, wherein the optimal input stream comprises the highest resolution input stream from the plurality of input streams having a quantization parameter value for the portion of the input stream that is within the range of acceptable quantization parameter values for the output stream; and
   outputting the portion of the optimal input stream as part of an output stream, wherein each portion of the output stream has a quantization parameter that falls within the range of acceptable quantization parameter values.

2. The computer-implemented method of claim 1, wherein the portion of each of the plurality of input streams comprises a picture or a block within a picture.

3. The computer-implemented method of claim 1, wherein the portion of each of the plurality of input streams comprises a segment of the input stream associated with a specific length of a piece of video content.

4. The computer-implemented method of claim 1, wherein the plurality of input streams comprises data packets associated with the same piece of video content and each of the plurality of input streams is encoded to a different resolution than the other input streams of the plurality of input streams.

5. The computer-implemented method of claim 1, wherein the output stream has a constant bitrate.

6. The computer-implemented method of claim 1 further comprising:
   encoding the optimal input stream to a specified resolution.

7. An apparatus comprising:
   one or more interfaces that to receive a plurality of input streams and output an output stream, wherein the output stream comprises a plurality of segments encoded to various resolutions and frame rates to meet optimum video quality;
   a rate control module that:
   determines a quantization parameter value for a portion of each of the plurality of input streams;
   determines a range of acceptable quantization parameter values for the output stream, wherein the range of acceptable quantization parameter values comprises a plurality of quantization parameter values bound by a minimum quantization parameter value and a maximum quantization parameter value, wherein the minimum and maximum quantization parameter values are determined based upon a certain level of perceptual quality and a maximum bitrate available for delivery of the output stream to a destination; and
   selects an optimal input stream segment from the plurality of input streams based upon the range of acceptable quantization parameter values for the output stream and a quality characteristic associated with the optimal input stream, wherein the optimal input stream segment comprises a segment of the highest resolution input stream from the plurality of input streams having a quantization parameter value for the portion of the input stream that is within the range of acceptable quantization parameter values for the output stream, wherein the optimal input stream segment is associated with a portion of a piece of video content, and wherein each portion of the output stream has a quantization parameter that falls within the range of acceptable quantization parameter values.

8. The apparatus of claim 7, wherein each portion of the piece of video content comprises a picture or a block within a picture.

9. The apparatus of claim 7, wherein the portion of the piece of video content corresponds with a specific length of the piece of video content.

10. The apparatus of claim 7, wherein the plurality of input streams comprises data packets associated with the same piece of video content and the plurality of input streams are encoded to a plurality of various resolutions.

11. The apparatus of claim 7, wherein the output stream has a constant bitrate.

12. The apparatus of claim 7, further comprising: an encoder that to encodes the optimal input stream segment to a specified resolution.

13. One or more non-transitory computer readable media having instructions operable to cause one or more processors to perform the operations comprising:
 receiving a plurality of input streams;
 determining a quantization parameter value for a portion of each of the plurality of input streams;
 determining a range of acceptable quantization parameter values for an output stream, wherein the range of acceptable quantization parameter values comprises a plurality of quantization parameter values bound by a minimum quantization parameter value and a maximum quantization parameter value, wherein the minimum and maximum quantization parameter values are determined based upon a certain desired level of perceptual quality and a maximum bitrate available for delivery of the output stream to a destination;
 selecting an optimal input stream from the plurality of input streams based upon the range of acceptable quantization parameter values for the output stream and a quality characteristic associated with the optimal input stream, wherein the optimal input stream comprises the highest resolution input stream from the plurality of input streams having a quantization parameter value for the portion of the input stream that is within the range of acceptable quantization parameter values for the output stream; and
 outputting the portion of the optimal input stream as part of an output stream, wherein each portion of the output stream has a quantization parameter that falls within the range of acceptable quantization parameter values.

14. The one or more non-transitory computer readable media of claim 13, wherein the portion of each of the plurality of input streams comprises a segment of the input stream associated with a specific length of a piece of video content.

15. The one or more non-transitory computer readable media of claim 13, wherein the plurality of input streams comprises data packets associated with the same piece of video content and each of the plurality of input streams is encoded to a different resolution than the other input streams of the plurality of input streams.

16. The one or more non-transitory computer readable media of claim 13, wherein the output stream has a constant bitrate.

17. The one or more non-transitory computer readable media of claim 13, wherein the instructions are further operable to cause the one or more processors to perform the operations comprising:
 encoding the optimal input stream to a specified resolution.

* * * * *